(12) United States Patent
Geng et al.

(10) Patent No.: US 9,424,077 B2
(45) Date of Patent: Aug. 23, 2016

(54) THROTTLE CONTROL ON CLOUD-BASED COMPUTING TASKS UTILIZING ENQUEUE AND DEQUEUE COUNTERS

(71) Applicants: Mao Geng, Foster City, CA (US); Yukching Leung, Palo Alto, CA (US); Ming Zhang, Shanghai (CN); Fan Wang, Shanghai (CN)

(72) Inventors: Mao Geng, Foster City, CA (US); Yukching Leung, Palo Alto, CA (US); Ming Zhang, Shanghai (CN); Fan Wang, Shanghai (CN)

(73) Assignee: SUCCESSFACTORS, INC., So. San Francisco, CA (US)

( * ) Notice: Subject to any disclaimer, the term of this patent is extended or adjusted under 35 U.S.C. 154(b) by 52 days.

(21) Appl. No.: 14/542,362

(22) Filed: Nov. 14, 2014

(65) Prior Publication Data
US 2016/0139952 A1    May 19, 2016

(51) Int. Cl.
  *G06F 9/46* (2006.01)
  *G06F 15/16* (2006.01)
  *G06F 11/00* (2006.01)
  *G06F 9/48* (2006.01)

(52) U.S. Cl.
  CPC ........... *G06F 9/4818* (2013.01); *G06F 9/4881* (2013.01)

(58) Field of Classification Search
  None
  See application file for complete search history.

(56) References Cited

U.S. PATENT DOCUMENTS

| | | | |
|---|---|---|---|
| 7,926,057 | B2 | 4/2011 | Chan et al. |
| 8,429,659 | B2 | 4/2013 | Bartfai-Walcott et al. |
| 8,621,099 | B2 | 12/2013 | Curtis |
| 8,630,969 | B2 | 1/2014 | Ziegler |
| 8,645,745 | B2 | 2/2014 | Barsness et al. |
| 8,650,323 | B2* | 2/2014 | Weinstock .......... H04L 12/5695 370/229 |
| 9,088,507 | B1* | 7/2015 | Sukonik .................. H04L 47/22 |
| 2007/0180451 | A1 | 8/2007 | Ryan et al. |
| 2011/0173038 | A1 | 7/2011 | Moon et al. |
| 2012/0005670 | A1 | 1/2012 | Driesen et al. |
| 2013/0212584 | A1 | 8/2013 | Heit |
| 2014/0019980 | A1 | 1/2014 | George et al. |
| 2014/0075034 | A1 | 3/2014 | Vasudevan et al. |
| 2014/0075445 | A1 | 3/2014 | Wang et al. |
| 2014/0081984 | A1 | 3/2014 | Sitsky et al. |
| 2014/0172888 | A1 | 6/2014 | Odenheimer et al. |
| 2014/0185628 | A1 | 7/2014 | Matthews et al. |
| 2015/0026294 | A1* | 1/2015 | Hiller .................... H04L 67/327 709/217 |

* cited by examiner

*Primary Examiner* — Bing Zhao
(74) *Attorney, Agent, or Firm* — Fountainhead Law Group PC

(57) ABSTRACT

Systems and methods for throttle control on cloud-based computing tasks are provided. An example method includes, obtaining a service request from a first user, in a plurality of users, of the computer system; in accordance with a first determination that placing the service request in a service queue associated with the first user would not cause an enqueue counter associated with the first user to be exceeded, causing the service request to be placed in the service quest to await execution. The method also includes, after the service request is placed in the service queue, in accordance with a second determination that executing the service request would not cause a dequeue counter associated with the first user to be exceeded, causing the service request to be executed.

19 Claims, 6 Drawing Sheets

THROTTLE CONTROL ON CLOUD-BASED COMPUTING TASKS UTILIZING ENQUEUE AND DEQUEUE COUNTERS

BACKGROUND

The present disclosure relates to computing and data processing, and in particular, to throttle control on cloud-based computing tasks.

A multi-tenancy cloud system often serves multiple customers at the same time, and service requests (also referred to herein as computing tasks or jobs) are sometimes scheduled by a centralized scheduling system for execution.

To prevent potential abuse (e.g., duplicitous requests leading to denial of service (DOS)), unintended or otherwise, throttle control is important in such a multi-tenancy cloud system. Not only should the total number of service requests submitted into a waiting queue be controlled (e.g., capped), but also the total number of service requests being serviced on a per customer basis.

Difficulties abound, however. One technical problem is that, without distinguishing the source of a service request, an unintended preferential treatment of service requests from certain customers may occur, which may cause dissatisfaction among other customers. For example, if a cloud system continuously allocates computing resources to one particular customer over another customer, the other customer may become underserved or even experience a service outage.

Another technical problem is that, without distinguishing the category (or type) of a service request, an unintended preferential treatment of service requests of a particular category may occur, which may cause performance deterioration to other categories of services requests. For example, if a cloud system continuously allocates computing resources to larger scale data write requests (which may be more time- and resource-consuming than read requests), smaller scale data read requests may be kept pending and even become timed out, even though fulfilling these read request would not otherwise impact overall system performance to a noticeable degree.

There is therefore a need for improved techniques for providing throttle control on cloud-based computing tasks.

SUMMARY

In one embodiment, a computer-implemented method obtains, at a computer system having one or more processors and memory storing one or more programs for execution by the one or more processors, a service request from a first user, in a plurality of users, of the computer system. The method then proceeds to cause the service request to be placed in the service quest to await execution in accordance with a first determination that placing the service request in a service queue associated with the first user would not cause an enqueue counter associated with the first customer to be exceeded. After the service request is placed in the service queue, the method causes the service request to be executed in accordance with a second determination that executing the service request would not cause a dequeue counter associated with the first user to be exceeded.

In another embodiment, a non-transitory computer readable storage medium stores one or more programs comprising instructions for: obtaining a service request from a first user, in a plurality of users, of the computer system; causing the service request to be placed in the service quest to await execution in accordance with a first determination that placing the service request in a service queue associated with the first user would not cause an enqueue counter associated with the first customer to be exceeded; and after the service request is placed in the service queue, causing the service request to be executed in accordance with a second determination that executing the service request would not cause a dequeue counter associated with the first user to be exceeded.

In another embodiment, a computer system comprises one or more processors, memory, and one or more programs. The one or more programs are stored in the memory and configured to be executed by the one or more processors. The one or more programs include instructions for: obtaining a service request from a first user, in a plurality of users, of the computer system; causing the service request to be placed in the service quest to await execution in accordance with a first determination that placing the service request in a service queue associated with the first user would not cause an enqueue counter associated with the first customer to be exceeded; and after the service request is placed in the service queue, causing the service request to be executed in accordance with a second determination that executing the service request would not cause a dequeue counter associated with the first user to be exceeded.

The following detailed description and accompanying drawings provide a better understanding of the nature and advantages of the present disclosure.

DETAILED DESCRIPTION

Figure 1:
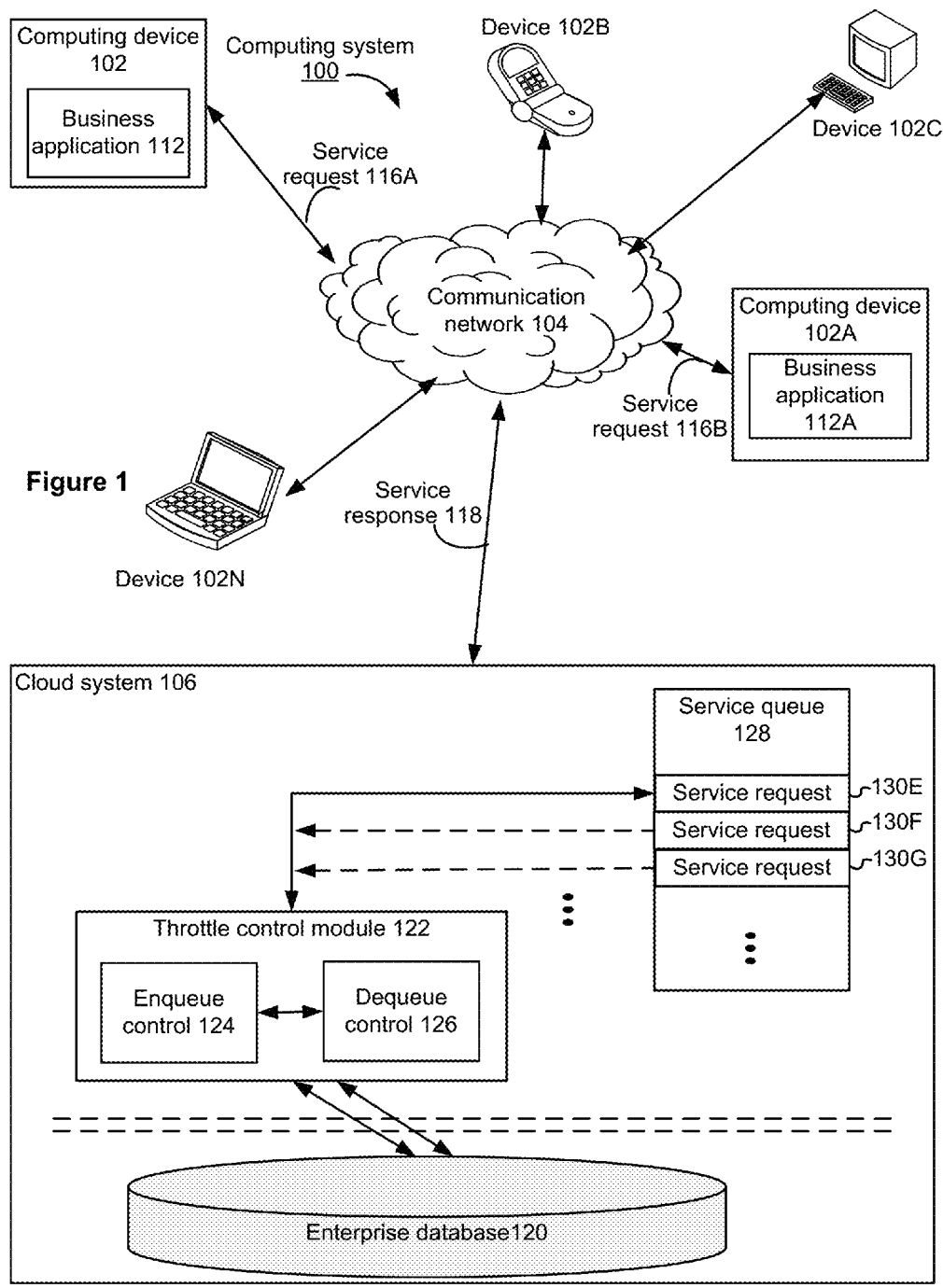
FIG. 1 is an example block diagram illustrating a computing systems for providing throttle control on cloud-based computing tasks in accordance with one embodiment.

Described herein are techniques for providing throttle control on cloud-based computing tasks. The apparatuses, methods, and techniques described below may be implemented as a computer program (software) executing on one or more computers. The computer program may further be stored on a non-transitory computer readable medium, such as a memory or disk, for example. A computer readable medium may include instructions for performing the processes described below. In the following description, for purposes of explanation, numerous examples and specific details are set forth in order to provide a thorough understanding various aspects of the present disclosure. It will be evident, however, to one skilled in the art that embodiments of the present disclosure as defined by the claims may include some or all of the features in these examples alone or in combination with other features described below, and may further include modifications and equivalents of the features and concepts described herein.

Some example embodiments described herein provide various technical solutions to provide throttle control on cloud-based computing tasks, and in particular to the above-identified technical problems by—for each customer of a multi-tenancy cloud system, using (1) an enqueue counter to monitor the total number of unfinished requests (e.g., either waiting or running) from a customer, and (2) a dequeue counter to monitor the total number of requests in execution (e.g., running) from the customer, to provide throttle control on how many service requests a particular customer may submit to a cloud system, thereby balancing the computing load and cloud performance among several cloud customers and preventing potential abuse of cloud resource.

INTRODUCTORY EXAMPLE

As a non-limiting example, when a customer submits (e.g., through a client device) a service request to a cloud system, a throttle control module within the cloud system first checks a enqueue counter assigned to the customer to determine whether placing the service request into a service queue (to await service/execution) would cause the enqueue counter to be exceeded. In some cases, an enqueue counter represents the total number of service requests submitted by a particular customer having either a waiting status (awaiting execution in the service queue) or a running status (e.g., being currently executed).

For example, if an enqueue counter assigned to a customer is set to 3, and there are already 3 service requests from this customer awaiting execution, any additional service requests from this customer would not be accepted into the service queue, because doing so would cause the customer to have a total number of 4 or more service requests awaiting execution, exceeding its assigned enqueue counter.

If a service request is not placed in the service queue, the customer is notified of the same, and in some cases advised to resubmit the service requests within a predefined time period (e.g., 2 minutes later). Alternatively, if the service request is placed in the service queue awaiting execution, the enqueue counter associated with this customer is increased by 1 (because there is now 1 more job having the waiting status).

Next, when the cloud system executes the service request, a dequeue counter assigned to the customer is increased by 1. In some cases, the dequeue counter assigned to a customer represents the total number of service requests from the customer that are in execution (e.g., running).

Further, when the service requests is completed (e.g., executed successfully), both the enqueue counter and the dequeue counter assigned to this customer are decreased by 1, as the customer now has 1 fewer running job.

Accordingly, a cloud system may track not only the total number of jobs awaiting service, but also the total number of job being executed/serviced on a customer by customer basis. Therefore, in some cases, one customer would not have a significantly greater number of jobs pending execution or already in execution than do other customers. In other words, cloud resources are judiciously allocated among several customers either evenly or based on prior agreements (e.g., agreed-upon pricing models), both of which may be considered by cloud customers as fair methods for resource allocation. As a result, cloud customers remain satisfied with their cloud performance—an important business goal for cloud service providers.

Additional Details of Disclosed Embodiments

Additional details of embodiments are now described in relation to the figures.

FIG. 1 is an example block diagram illustrating a computing system 100 for providing throttle control on cloud-based computing tasks in accordance with one embodiment.

In one embodiment, the computing system 100 includes one or more computing devices 102 (e.g., 102A, 102B, 102C, . . . , and 102-N), a communication network 104, and a cloud system 106.

In one embodiment, a computing device 102 enables a user to interact with one or more business applications resident thereon, which in turn communicate with (e.g., submits service requests or jobs to) the cloud system 106 or an enterprise database 120 implemented thereon.

In one embodiment, a computing device 102 obtains user requests in a business application and submits corresponding service requests to the cloud system 106 (or the enterprise database 120). For example, a user request may be a request to change another user's business transaction history in a reporting module within a customer relationship management (CRM) application, and a corresponding service request may be a write request that updates the other user's transaction history in an enterprise database servicing the CRM application.

The computing device 102 is a mobile computing device, such as a laptop computer, a notebook computer, a smart phone, a smart watch, or a tablet computer. In some cases, a computing device 102 is a light weight client device (also referred to herein as a client).

The computing device 102 includes (e.g., hosts) a business application 112 (e.g., 112A). In one embodiment, a business application 112 submits one or more service requests 116 (e.g., 116A and 116B) to the cloud system 106 for processing and receives corresponding service responses 118.

The business application 112 is an enterprise resource planning (ERP) application, an enterprise access control application, an enterprise access control violation management application, a regulation management application, an enterprise process control management, an enterprise fraud detection management application, an enterprise risk management application, an enterprise data processing application, an enterprise travel planning and expense reimbursement application, an enterprise data management (EDM) application, or an enterprise feedback management (EFM) application. In one embodiment, the business application 112 is a smart phone app.

The communication network 104 interconnects one or more computing devices 102 with each other and with the cloud system 106. In one embodiment, the communication network 104 optionally includes the Internet, one or more local area networks (LANs), one or more wide area networks (WANs), other types of networks, or a combination of such networks.

The cloud system 106 provides service responses responsive to one or more service requests e.g., received from one or more computing devices 102 (or customers). In one embodiment, the cloud system 106 is a computing cloud (or a portion thereof) that processes service requests from a plurality of computing devices 102 (e.g., mobile or otherwise) and provides service responses thereto.

In one embodiment, the cloud system 106 includes a throttle control module 122, a service queue 128, and an enterprise database 120.

In one embodiment, the throttle control module 122 provides throttle controls to services requests submitted to the cloud system 106, e.g., on a customer by customer basis. In one embodiment, the throttle control module 122 allows a service request to be placed in a service queue to await execution when a predefined throttling threshold for a particular customer is met or throws a throttling exception when the predefined throttling threshold is exceeded. In one embodiment, the throttle control module 122 also provides an auto-recovery feature, which scans dead service requests (e.g., running on the cloud system 106) and conditionally recovers a dead service request by placing it back into a service queue to await execution.

In one embodiment, the throttle control module 122 includes an enqueue control 124 and a dequeue control 126. In one embodiment, the enqueue control 124 selectively places service requests submitted by cloud customers in a service queue to await execution. In one embodiment, the enqueue control 124 maintains (e.g., controls), in a service queue, a predefined total number of service requests having a same job type (but of various different statuses, such as either a running status or a waiting status) from a particular customer. For example, no more than 5 read requests, running or waiting, from the device 102A (e.g., associated with the customer A) are placed or maintained in a service queue.

In one embodiment, the dequeue control 126 conditionally (1) selects a service request from a service queue for execution or (2) delays its execution by a predefined time period, e.g., temporarily or permanently. In some cases, the dequeue control 126 delays the execution of a service request by placing the service request at a different location within the service queue, such as relocating the service request from the beginning of a queue to the middle or end of the queue. In one embodiment, the dequeue control 126 controls (e.g., maintains) in the service queue, a predefined total number of service requests of a same type for each customer, whose status is "running" (or "in execution" or the like).

In one embodiment, the service queue 128 hosts one or more service requests 130E-130G that are awaiting execution. For example, a service queue can include a first request to read data from the enterprise database 120, a second request to write data to the enterprise database 120, a third request to both read and write data to the enterprise database 120, a fourth request to restart the enterprise database 120, and so on.

In one embodiment, the enterprise database 120 manages data stored thereon in accordance with service requests 116 submitted by one or more computing devices, e.g., updating a data table in accordance with a write request or providing data responsive to a read request. In one embodiment, the enterprise database 120 stores and manages data for one or more business (e.g., enterprise) applications. In one embodiment the enterprise database 120 stores business data, such as sales/business expenses/revenues, customer profiles, and supplier profiles.

In one embodiment, the cloud system 106 is a multi-thread environment, and one or more counting mechanisms are employed to provide throttle control on service requests submitted by cloud customers. For example, a counter mechanism may be used to calculate the total number of (waiting/pending, running, or both) service requests of a specific type (e.g., read, write, or both) from a particular cloud customer. In some cases, the one or more counting mechanisms include an enqueue counter or a dequeue counter, for example.

In one embodiment, the one or more counting mechanisms are applied or enforced on a per customer basis. For example, each cloud customer is assigned its own enqueue counter and dequeue counter. These customer specific approaches are advantageous, because they (1) avoid significant performance imbalance or difference (and thus a perceived unfair resource allocation) among several cloud customers, thereby reducing or eliminating customer dissatisfaction; and (2) prevent potential abuse or overuse of cloud resource, thereby protecting performance integrity of the cloud system.

For example, in accordance with a requirement that no more than 5 requests, reading or writing, from customer A are maintained in a service queue, the enqueue control 124 may decline accepting additional service requests submitted by the customer A into the service queue. This is advantageous, because a service queue is often of a limited size (in terms of how many jobs can be included therein) and accepting a large number of jobs from the one cloud customer could thus lead to service outage (either by outright denial or prolonged wait time) to jobs from other cloud customers. For example, if a cloud system's service queue is occupied mostly by jobs submitted by the customer A, then other cloud customers' jobs may not be accepted into the service queue to await execution in a time fashion and as a consequence become time-out.

For another example, in accordance with a requirement that no more than 2 requests, reading or writing, from customer B are executed by a cloud system at the same time, the dequeue control 126 may decline executing another service request (even if it is the first request in the service queue) from the customer B. This is advantageous, because the cloud system's computing resources are often limited, and thus executing (e.g., running) additional jobs from one cloud customer could lead to service outage to other cloud customers. For another example, if a cloud system spends most of its resources executing customer B's jobs, other cloud customers may not receive adequate cloud resources for executing their own jobs, and consequently a service starvation of those jobs may result.

Using the enqueue counter and the dequeue counter in these ways is advantageous. First, jobs in execution often consume more computing resources than those awaiting execution. Thus, it may be important to keep track how many jobs are in execution (e.g., jobs having running status) for a particular customer—using the dequeue counter—as opposed to simply those still awaiting execution.

Second, jobs submitted and accepted to await execution also sometimes consume limited computing resources. For example, a service queue is often of a limited size and thus only a limited number of jobs can be accepted into the service queue. Thus, it may also be important to keep track of how many jobs submitted by a particular customer have been accepted to await execution and are being currently executed—using the enqueue counter.

In some cases, by using of combination of these two counters, a cloud system can keep track of the total number of cloud computing resources a particular customer is consuming (compared to resource consumption by other customers). Using this analysis, a multi-tenancy cloud system can more judiciously balance its resources among several customers, to avoid performance imbalance and customer dissatisfactions resulted therefrom.

Figure 2:
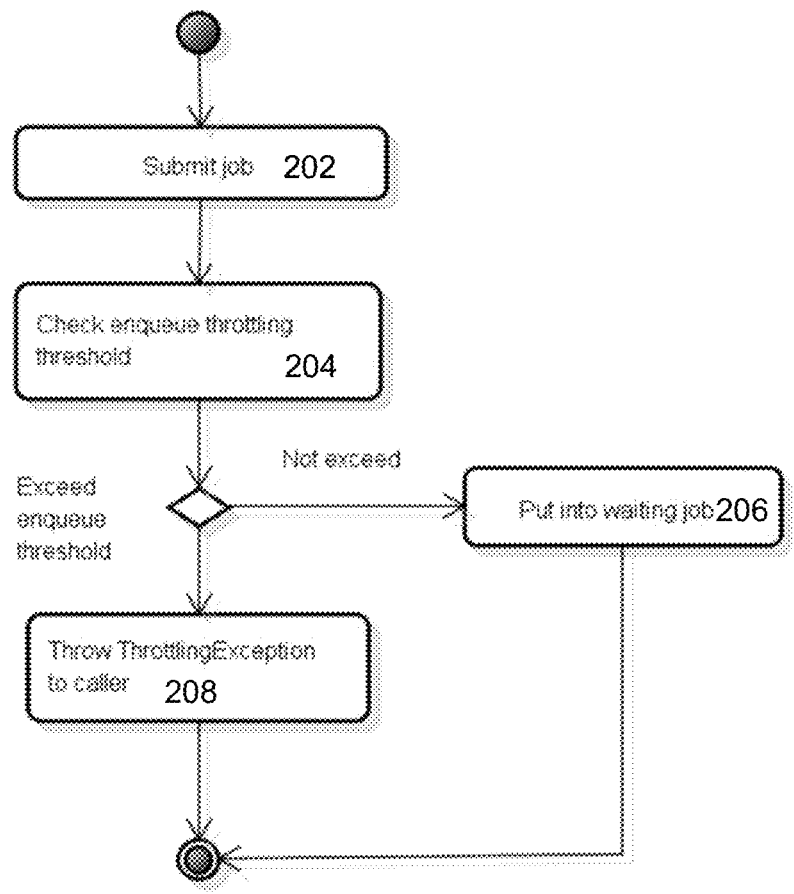
FIG. 2 is an example flow chart illustrating a first method for enqueuing jobs on a cloud-based computing system in accordance with one embodiment.

FIG. 2 is an example flow chart illustrating a method 200 for enqueuing jobs on a cloud-based computing system in accordance with one embodiment.

As shown in FIG. 2, in one embodiment, when a customer submits (202) a job having a particular job type to a cloud system, the cloud system (or a throttle control module included therein) checks (204) an enqueue throttling threshold (e.g., a total number of a same type of jobs having either a "running" status or a "waiting" status for this customer) to determine whether adding the job to the service queue would exceed the enqueue throttling threshold assigned to this customer having the particular job type.

In some cases, the enqueue throttling threshold is customer, client, device, or job type (e.g., a read or write request) specific. For example, an enqueue throttling threshold is assigned to each customer, client, device, or job type respectively, and the total number of jobs (or service requests) from a particular customer, client, device, or type is maintained to be equal to or less than the enqueue throttling threshold. For another example, a particular cloud customer may have only a predefined number of jobs awaiting execution (in a service queue) or being executed (by the cloud system). More specifically, if an enqueue throttling threshold is customer specific, then all jobs submitted by a particular customer are subject to the enqueue throttling threshold, regardless of job type or from which device a job was submitted. For another example, if an enqueue throttling threshold is device specific, then all jobs submitted from a particular device are subject to the enqueue throttling threshold, regardless of job type or by which customer a job was submitted. For another example, if an enqueue throttling threshold is job type specific, then all jobs having a particular job type are subject to the enqueue throttling threshold, regardless of from which device or by which customer a job was submitted.

These techniques are advantageous, as they prevent unintended performance imbalance among and potential overuse or abuse by cloud customers. For example, a particular customer cannot clog, intentionally or otherwise, a cloud system by submitting a large number jobs (having either a running or waiting status) and thus consuming significantly more cloud resources (e.g., network or computing) than other cloud customers.

As also shown in FIG. 2, in one embodiment, when adding a job to the service queue would cause the enqueue throttling threshold assigned to a customer to be exceeded, the cloud system declines to place the job into the service queue (wherein all job await execution). Instead, the cloud system generates (208) a throttling exception to the customer who submitted the job that the job is not added to the service queue and may need to be resubmitted at a later time.

In one embodiment, when adding the job to the service queue would not cause the enqueue throttling threshold assigned to the customer to be exceeded, the cloud system assigns a "waiting" status and places (206) the job into the service queue to await execution. For example, based on the determinations that (1) there are currently 4 jobs (e.g., service requests) from customer A and that (2) the enqueue throttling threshold is 10, the throttle control module concludes that adding the job to the service queue would not exceed the enqueue throttling threshold assigned to the customer A. Based on this conclusion, the throttle control module places (or puts 206) the job in the service queue to await execution and assigns the job a "waiting" status.

Figure 3:
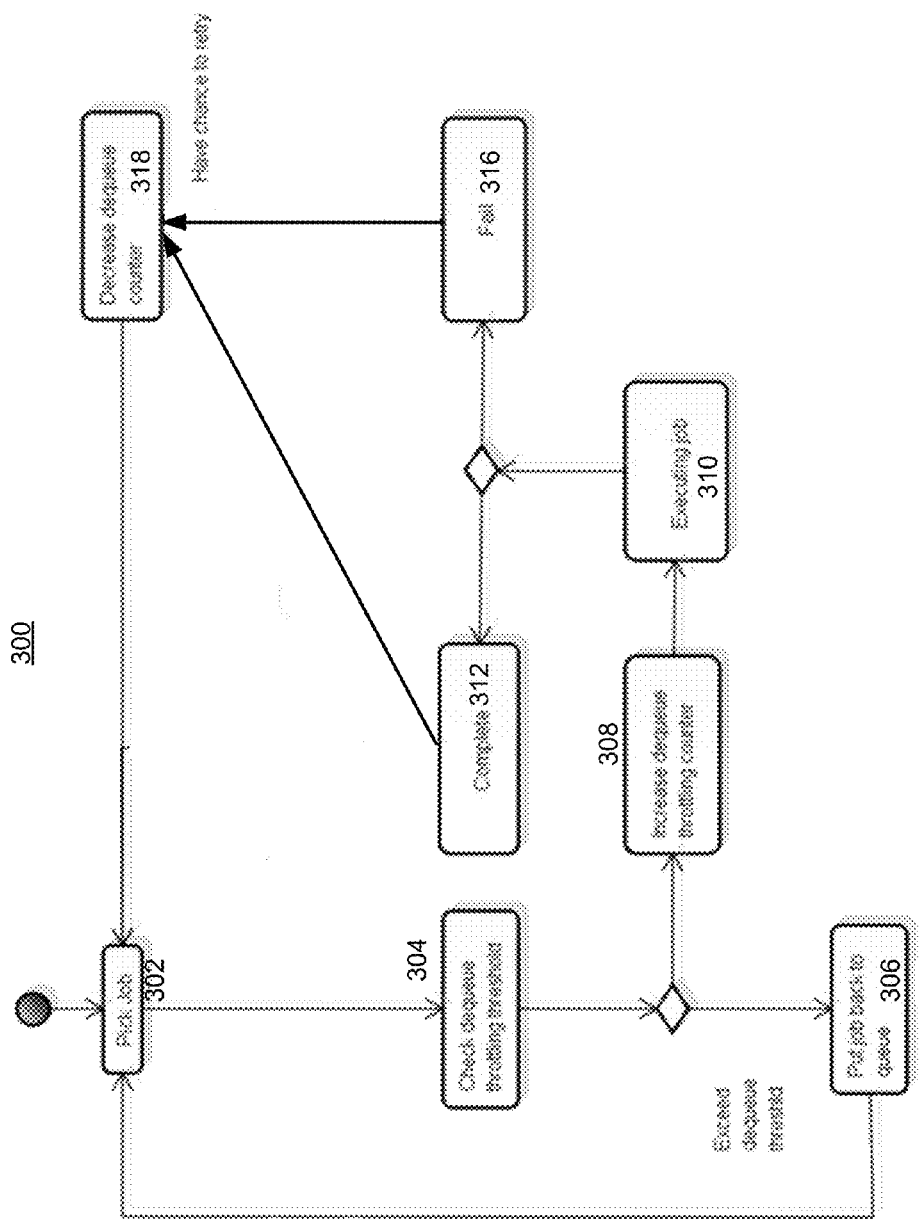
FIG. 3 is an example flow chart illustrating a second method for dequeuing jobs on a cloud-based computing system in accordance with one embodiment.

FIG. 3 is an example flow chart illustrating a method 300 for dequeuing jobs on a cloud-based computing system in accordance with one embodiment.

As shown in FIG. 3, in one embodiment, before selecting (302) a job from a service queue for execution, a throttle control module checks (304) a dequeue throttling threshold (e.g., a total number of a particular type of jobs having a "running" status submitted by a customer) to determine whether to execute (or run) the job. In some cases, the dequeue throttling threshold is customer, client, device, or job type specific. For example, a dequeue throttling threshold is assigned to each customer, client, device, or job type, respectively, and the total number of jobs having a running status (e.g., in execution) from a particular customer, client, device, or job type is maintained to be equal to or less than the dequeue throttling counter.

As also shown in FIG. 3, in one embodiment, when executing (or running) a job would cause the dequeue throttling counter to be exceeded, the cloud system declines to executed the job (e.g., immediately). Instead, the cloud system places (306) the job back into the service queue (e.g., at the same previous location or a different location) to await execution again.

In one embodiment, when executing (or running) the job would not cause the dequeue throttling threshold to be exceeded, the cloud system increases (308) the dequeue throttling threshold and begins to execute the job.

In one embodiment, after successfully completing (312) a job, the cloud system (or the throttle control module included therein) decreases by 1 the dequeue throttling counter (which tracks the total number of jobs having the running status) assigned to this customer, because this customer has one fewer "running" job.

Alternatively, if the cloud system fails (316) to execute a job (e.g., does not not complete the job successfully), the cloud system turns to determine whether the job is to be retried (e.g., within a predefined time period in the future, such as in 3 minutes).

If the cloud system deems the job retriable (because it has not been retried for more than a predefined number of times, such as 8 retries), the cloud system decreases (318) the dequeue counter by 1, as the job, which although may be retried within a predefined time period, is no long a running job.

In one embodiment, the cloud disposes of a job after one or more iterations of the method 300 and repeats the method 300 for each job awaiting execution in the service queue. By these ways, all jobs within a service queue may be evaluated for execution in view of cloud customers' respective enqueue and dequeue thresholds FIG. 4 is an example flow chart illustrating a method 400 for recovering jobs on a cloud-based computing system in accordance with one embodiment.

Figure 4:
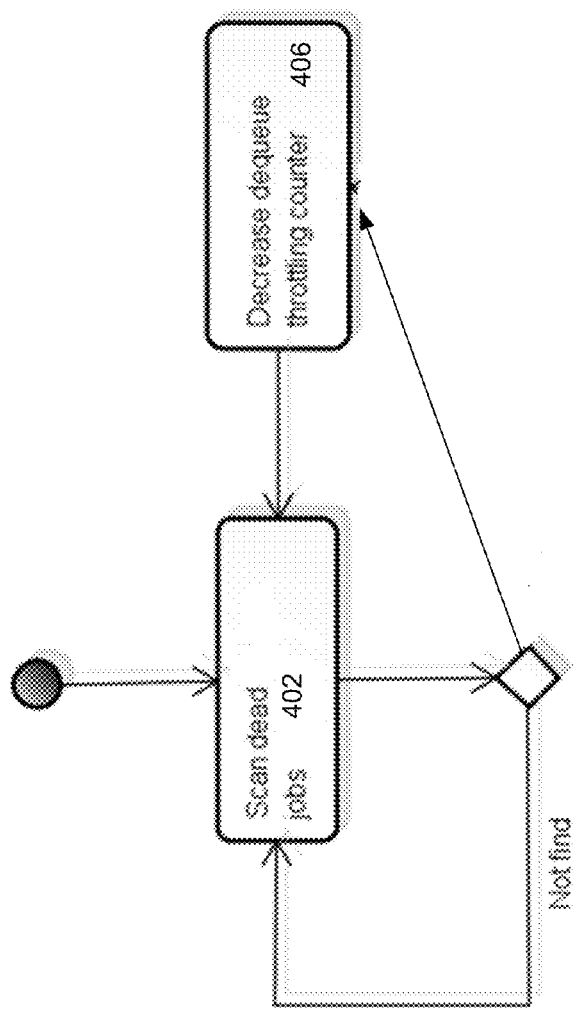
FIG. 4 is an example flow chart illustrating a third method for recovering jobs on a cloud-based computing system in accordance with one embodiment.

As shown in FIG. 4, in some cases, the throttle control module scans (402) dead jobs on a predefined time schedule or randomly. In some cases, a dead job is a job running on a cloud system without a corresponding requesting counterpart on a customer side. In some cases, a dead job may have an in-progress status, but has in fact finished. In other cases, a dead job is a job running on a cloud system without a corresponding requesting counterpart on a customer side. For example, when a customer reboots, a computing device, a service request submitted to a cloud system through the computing device may become dead, as a service response (corresponding to the service request) would not be property delivered to the customer.

In some cases, the throttle control module on the cloud system scans all running jobs on the cloud system and determines which running jobs have become dead. In some cases, when a dead job is found, the throttle control module decreases (406) a dequeue throttling counter associated with the customer, as the customer now has one fewer running job. In some cases, after a dead job is recovered, the cloud system places the job back into the service queue and decreases the dequeue throttling counter by 1.

Figure 5:
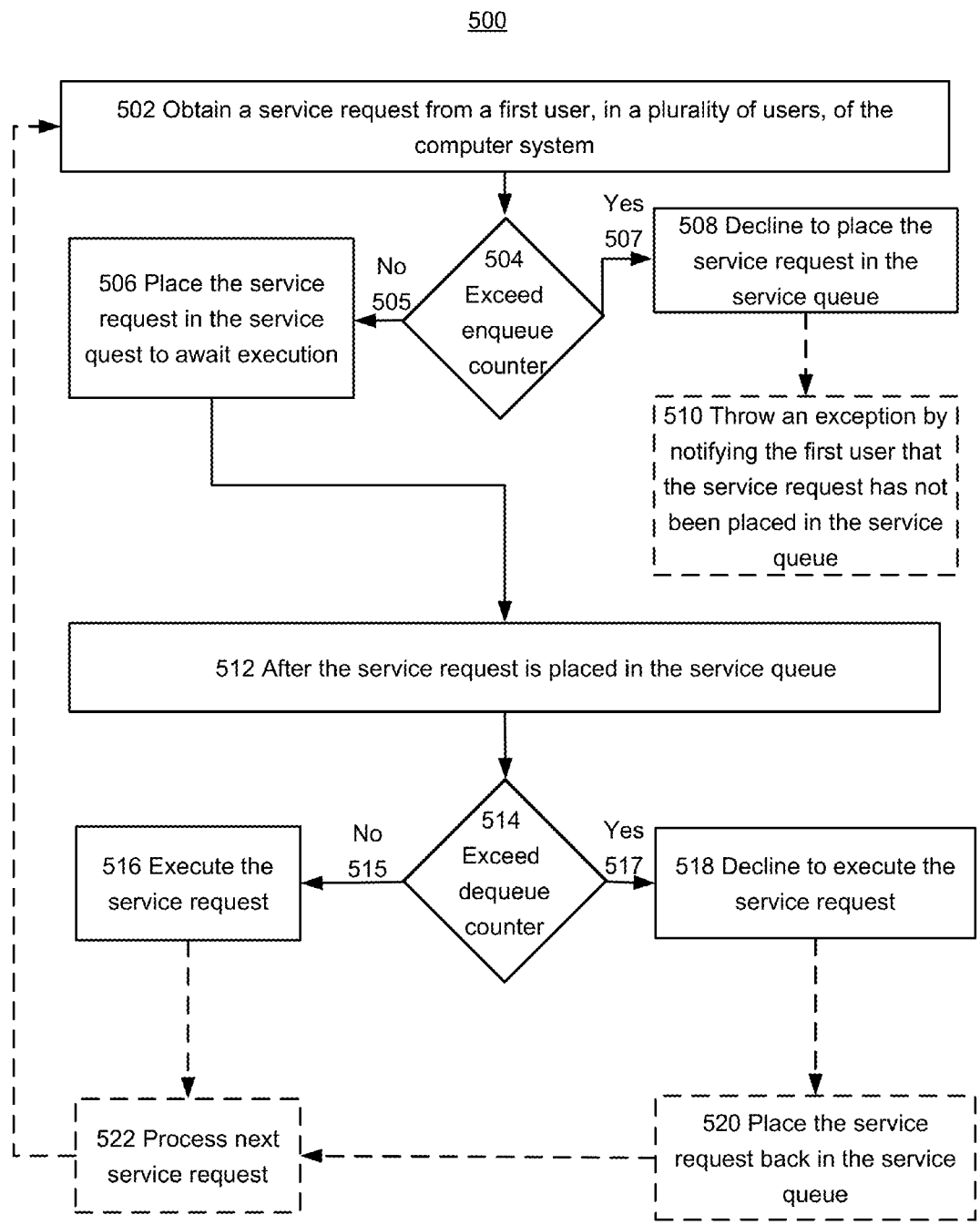
FIG. 5 is an example flow chart illustrating a fourth method for providing throttle control on cloud-based computing tasks in accordance with one embodiment.

FIG. 5 is an example flow chart illustrating a method 500 for providing throttle control on cloud-based computing tasks in accordance with one embodiment.

In one embodiment, the method 500 is implemented at a computer system, such as the cloud system 106 as shown in FIG. 1. In one embodiment, the computer system is equipped with one or more processors and memory storing one or more programs for execution by the one or more processors.

In one embodiment, the method 500 includes, obtaining (502) (by the cloud system 106 or the throttle control module 122 included therein) a service request from a first user, in a plurality of users, of the computer system. For example, in a multi-tenancy cloud system, several different customers submits jobs to a cloud system, to read or write from an enterprise database resident on the cloud system, at the same time. The cloud system then determines whether to accept these jobs into a service queue to await execution, whether to execute one or more of these job, and if so, in what order.

In one embodiment, when conditions relating to a customer's enqueue counter are met, a job is accepted into a service queue to await execution. In one embodiment, in accordance with a first determination that placing the service request in a service queue associated with the first user would not cause an enqueue counter associated with the first customer to be exceeded ("No" 505), the method continues by causing the service request to be placed (506) in the service quest to await execution. For example, when adding a service request into a service queue would not exceed an enqueue counter assigned to the first user, the cloud system places the service request in the service queue for further considerations for execution (e.g., in accordance with the dequeue counter assigned to the customer).

In some cases, each time a customer submits a job to the cloud system, the cloud system checks the enqueue counter assigned to the customer by executing a first database query (e.g., update throttling_counter set counter=counter+1 where company_id={company_id} and job_type={job_type} and counter_type='enqueue' and counter<{enqueue_threshold_for_this_job_type_and_jcustomer}).

When conditions relating to a customer's enqueue counter are met, a job is placed into a service queue to await execution. For example, if the value returned from the first database query is 1, then adding the instant job to the service queue would not exceed the enqueue threshold assigned to this customer. As a result, the cloud system causes (506) the instant job to be placed into the service queue and increases the enqueue counter assigned to this customer by 1.

Alternatively, when conditions relating to a customer's enqueue counter are not met, a job is not accepted into a service queue and may need to be resubmitted. For example, if the value returned from the first database query is 0, then adding the job to the service queue would exceed the enqueue threshold assigned to this customer. Thus, the cloud system declines (508) to place the job into the service queue. In some cases, the cloud system optionally throws an enqueue exception to notify the customer that the job has not been properly executed (e.g., due to a present lack of cloud resource) and it may need to be resubmitted at a future time.

In one embodiment, after placing the service request in the service queue (512), in accordance with a second determination that executing the service request would not cause a dequeue counter associated with the first user to be exceeded ("No" 515), the cloud system causes the service request to be executed (516). For example, if running/executing a job would not cause a dequeue counter assigned to a customer to be exceed, the cloud system causes the job to be executed and its response returned back to the customer.

In one embodiment, the cloud system increases a customer's dequeue counter when it decides to execute one of the customer's jobs. For example, in one embodiment, causing the service request to be executed includes causing the dequeue counter associated with the first customer to be increased.

In one embodiment, after the service request is successfully executed/completed, the cloud system proceeds to process the next service request (522), e.g., by determining whether to place the next incoming service request in the service queue to await execution.

In one embodiment, before executing each job in the service queue, the cloud system executes a second database query to determine whether executing the job would exceed the customer's dequeue counter (e.g., update throttling_counter set counter=counter+1 where company_id={company_id} and job_type={job_type} and counter_type='dequeue' and counter<{dequeue_threshold_for_this_job_type_and_customer}).

For example, if the value returned from the second database query is 1, then it means that the dequeue threshold associated with current job type and the customer would not be exceeded, and thus the cloud system proceeds to execute the job, either immediately or after a short delay.

Alternatively, in some cases after being considered for execution, a job is not immediately executed when conditions relating to a customer's dequeue counter are not met. For example, in one embodiment, in accordance with a fourth determination that executing the service request would cause the dequeue counter associated with the first user to be exceeded ("Yes" 517), the cloud system declines (518) to cause the service request to be executed e.g., for a first predefined time period.

For example, if the value returned from the second database query is 0, then it means that the dequeue threshold associated with current job type and the customer would be exceeded. As a result, the cloud system declines to immediately execute the job, but may reconsider the job for execution at a later time.

In one embodiment, if a job is passed on for immediate execution, it may be reconsidered. Therefore, in one embodiment, declining to cause the service request to be executed includes, in accordance with a fifth determination that the service request is to be retried within a second predefined time period, causing the service request to be placed back into the service queue; and causing the service request to be retried within a second predefined time period.

To prevent the same job from being reconsidered for execution again and again (which could effectively prevent other jobs from being reconsidered or executed), however, when placing a job back to a service queue due to exceeding the dequeue counter, the cloud system delays reconsidering that job for execution for a certain time period.

In some case, the delay time is calculated using a formula, such as, 5*the number of times a job has been considered for execution*2 seconds. For example, the first time when a job is put back to a waiting queue, it will delayed for 10 (5*1*2) seconds; and the second time, the job is picked up and denied execution, it will be delayed for 20 (5*2*2) seconds.

In one embodiment, causing the service request to be placed back (520) into the service queue includes, causing the service request to be placed at a same location within the service queue as before. For example, if a job is denied immediate execution, the throttle control module places the job back at the same spot in a service queue where in the job was previously awaiting execution. For example, if the job was previously at the top of the service queue when selected for determine whether it should be executed, the cloud system places the job on the top of the service queue. This way, a job can maintain its priority (or seniority). This is advantageous, because it can prevent a particular job from remaining in a service queue for so long that a time-out occurs.

In one alternative embodiment, causing the service request to be placed back (520) into the service queue alternatively includes, causing the service request to be placed at a different location within the service queue from before. For example, if a job is denied immediate execution, the cloud system places the job back, albeit at a different spot, in the service queue (e.g., different from where in the job was previously awaiting execution). For example, if the job was previously at the top of the service queue, the job is placed back to the bottom of the service queue. This way (e.g., similar to a round robin algorithm), all job awaiting execution can have a fair chance of being executed or at least be considered for execution. This is advantageous, because it ensures the remaining jobs in a service queue would also received a fair chance for using cloud resource.

In some cases, a job that has been executed, but did not complete successfully, may be retried. In one embodiment, the method optionally includes, in accordance with a seventh determination that the service request is not successfully completed, in accordance with an eighth determination that the service request is to be tried within a third predefined time period, causing the dequeue counter associated with the first user to be decreased; and causing the service request to be tried within the third predefined time period.

In some cases, when a job fails to execute, it is allowed for 3 more retries. When a job is still retriable, the cloud system prepare the job for further retry and updates the dequeue counter by executing a third database query (e.g., update throttling_counter set counter=counter−1 where company_id={company_id} and job_type={job_type} and counter_type='dequeue_counter'). As can be seen, here, the dequeue counter is decreased, but the enqueue counter is not, as the job, although not currently running, is still in the service queue awaiting retry.

In some cases, after retrying a job for more than a predefined number of time, the cloud system abandons the job and adjust the customer's enqueue and dequeue counter accordingly. In one embodiment, the method optionally includes in accordance with a ninth determination that the service request is not to be tried within the third predefined time period, abandoning the service request by removing the service request from the service queue without execution; causing the dequeue counter associated with the first user to be decreased; and causing the enqueue counter associated with the first user to be decreased.

For example, if a failed job has been retried for 5 times (the maximum allowed number of retries in this case) but still did not complete successfully, the cloud system removes the job from the service queue and updates both the enqueue counter and the dequeue counter by executing a fourth database query (e.g., update throttling_counter set counter=counter−1 where company_id={company_id} and job_type={job_type}). As can be seen, in this case, both the enqueue counter and the dequeue counter are decreased. Because the job has been removed from the service queue and thus is neither awaiting execution (waiting) nor being executed (running).

Figure 6:
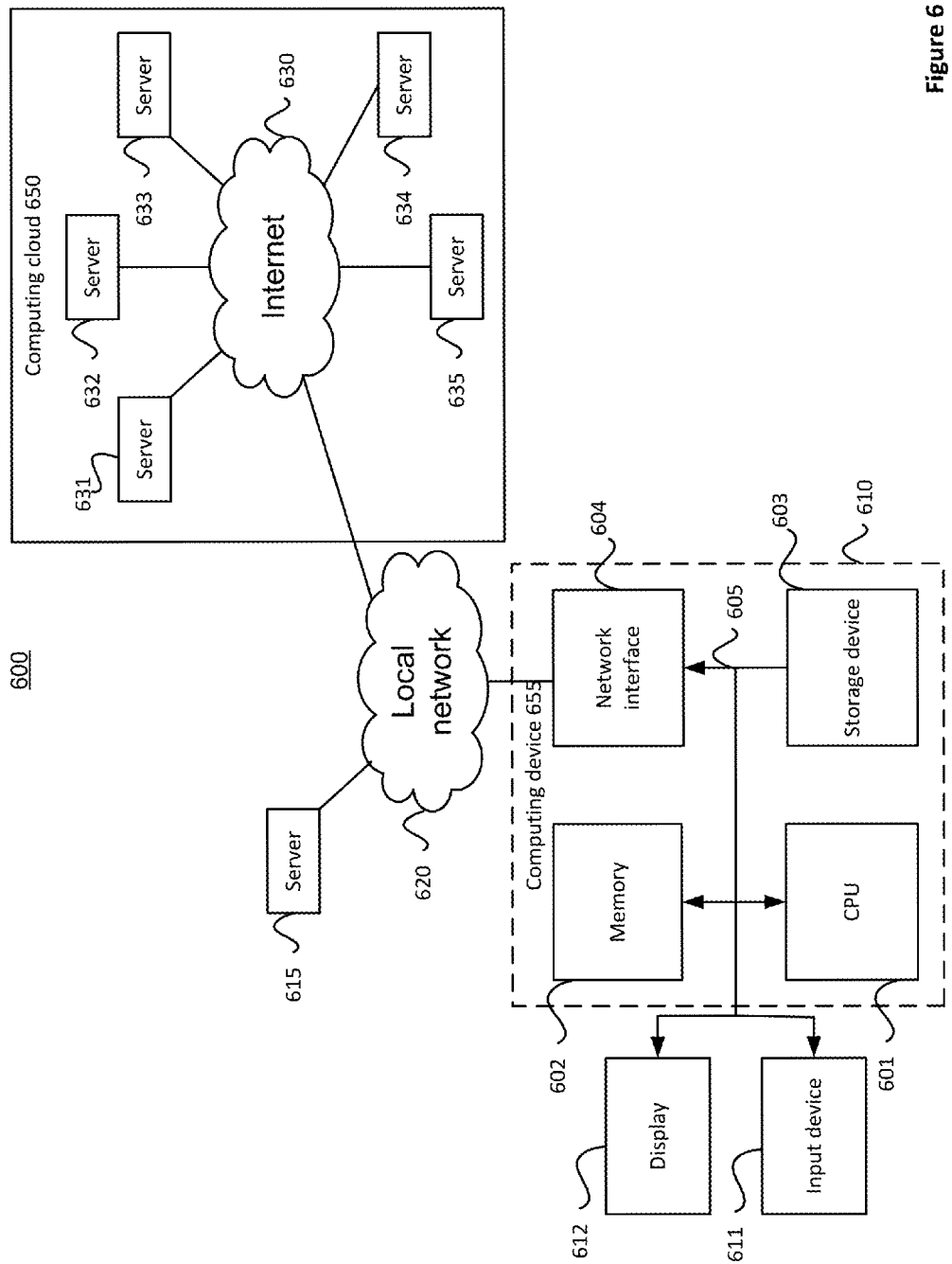
FIG. 6 is an example block diagram illustrating a computing system for providing throttle control on cloud-based computing tasks in accordance with one embodiment.

FIG. 6 is an example block diagram illustrating a computing system for providing throttle control on cloud-based computing tasks, in accordance with one embodiment.

As shown in FIG. 6, in one embodiment, the computing device 655 includes a bus 605 or other communication mechanism for communicating information, and a processor 601 coupled with the bus 605 for processing information. In one embodiment, the computing device 655 also includes a memory 602 coupled to bus 605 for storing information and instructions to be executed by processor 601 (CPU), including information and instructions for performing the techniques described above, for example. In one embodiment, the memory 602 may also be used for storing variables or other intermediate information during execution of instructions to be executed by processor 601. In one embodiment, the memory 602 includes, but is not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computing system can obtain information. In one embodiment, the storage device 603 may include source code, binary code, or software files for performing the techniques above, for example. The storage device 603 and the memory 602 are both examples of computer readable mediums.

In one embodiment, the computing device 655 may be coupled via the bus 605 to a display 612, such as a cathode ray tube (CRT) or liquid crystal display (LCD), for displaying information to a user. An input device 611 such as a keyboard and/or mouse is coupled to the bus 605 for communicating information and command selections from the user to the processor 601. The combination of these components allows the user to communicate with the computing device 655. In some systems, the bus 605 may be divided into multiple specialized buses.

In one embodiment, the computing device 655 includes a network interface 604 coupled with the bus 605. In one embodiment, the network interface 604 provides two-way data communications between the computing system 610 and the local network 620. In one embodiment, the network interface 604 includes a digital subscriber line (DSL) or a modem to provide data communication connection over a telephone line, for example. Another example of the network interface 604 is a local area network (LAN) card to provide a data communication connection to a compatible LAN. Wireless links are another example. In any such implementation, the network interface 604 sends and receives electrical, electromagnetic, or optical signals that carry digital data streams representing various types of information.

In one embodiment, the computing device 655 sends and receives information, including messages or other interface actions, through the network interface 604 across a local network 620, an Intranet, or the Internet 630. In one embodiment, the local network, the computing system 610 communicates with a plurality of other computer machines, such as a server 615 or a computing cloud 650. In one embodiment, the computing device 655 and server computer systems represented by the server 615 form a cloud computing network, which may be programmed with processes described herein. In the Internet example, software components or services may reside on multiple different computing systems 610 or servers 631-635 across the network. In one embodiment, the processes described above are implemented at the computing cloud 650, which includes one or more servers from the servers 631-635. In one embodiment, the server 631 transmits actions or messages from one component, through the Internet 630, the local network 620, and the network interface 604 to a component of the computing device 655. In one embodiment, the software components and processes described above are implemented on any computer system and send and/or receive information across a network.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first computing task could be termed a second job, and, similarly, a second computing task could be termed a first computing task, without changing the meaning of the description, so long as all occurrences of the "first computing task" are renamed consistently and all occurrences of the "second computing task" are renamed consistently. The first computing task and the second computing task are both computing tasks, but they are not the computing task.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
at a computer system having one or more processors and memory storing one or more programs for execution by the one or more processors,
obtaining a service request from a first user, in a plurality of users, of the computer system;
in accordance with a determination that placing the service request in a service queue associated with the first user would not cause an enqueue counter associated with the first user to be exceeded,
causing the service request to be placed in the service queue to await execution, wherein the enqueue counter reflects service requests awaiting execution and currently being executed; and
after the service request is placed in the service queue,
in accordance with a determination that executing the service request would not cause a dequeue counter that is separate from the enqueue counter associated with the first user to be exceeded,
causing the service request to be executed;
in accordance with a determination that the service request is not successfully completed and the service request is not to be tried within a first predefined time period,
abandoning the service request by removing the service request from the service queue without execution;
causing the dequeue counter associated with the first user to be decreased; and
causing the enqueue counter associated with the first user to be decreased.

2. The method of claim 1, further comprising in accordance with a determination that placing the service request in a service queue associated with the computer system would cause the enqueue counter associated with the first user to be exceeded, declining to place the service request in the service queue to await execution; and throwing an exception by notifying the first user that the service request has not been placed in the service queue.

3. The method of claim 1, further comprising in accordance with a determination that executing the service request would cause the dequeue counter associated with the first user to be exceeded, declining to cause the service request to be executed.

4. The method of claim 3, wherein declining to cause the service request to be executed includes, in accordance with a determination that the service request is to be retried within a second predefined time period, causing the service request to be placed back into the service queue; and causing the service request to be retried within the second predefined time period.

5. The method of claim 4, wherein causing the service request to be placed back into the service queue includes, causing the service request to be placed at a same location within the service queue; or causing the service request to be placed at a different location within the service queue.

6. The method of claim 1, wherein causing the service request to be placed in the service quest to await execution includes, causing the enqueue counter associated with the first user to be increased.

7. The method of claim 6, further comprising in accordance with a determination that the service request is completed, causing the enqueue counter associated with the first user to be decreased.

8. The method of claim 1, wherein causing the service request to be executed includes, causing the dequeue counter associated with the first user to be increased.

9. The method of claim 8, further comprising in accordance with a determination that the service request is successfully completed, causing the enqueue counter associated with the first user to be decreased.

10. The method of claim 8, further comprising in accordance with a determination that the service request is not successfully completed, in accordance with the determination that the service request is to be tried within the first predefined time period, causing the dequeue counter associated with the first user to be decreased; and causing the service request to be tried within the first predefined time period.

11. The method of claim 1, wherein the service queue is of a predetermined size or a variable size.

12. A non-transitory computer readable storage medium storing one or more programs, the one or more programs comprising instructions, which when executed by a computing system with one or more processors, cause the computing system to execute a method of:

obtaining a service request from a first user, in a plurality of users, of the computer system;

in accordance with a determination that placing the service request in a service queue associated with the first user would not cause an enqueue counter associated with the first user to be exceeded, causing the service request to be placed in the service queue to await execution, wherein the enqueue counter reflects service requests awaiting execution and currently being executed; and after the service request is placed in the service queue, in accordance with a determination that executing the service request would not cause a dequeue counter that is separate from the enqueue counter associated with the first user to be exceeded, causing the service request to be executed;

in accordance with a determination that the service request is not successfully completed and the service request is not to be tried within a first predefined time period, abandoning the service request by removing the service request from the service queue without execution;

causing the dequeue counter associated with the first user to be decreased; and causing the enqueue counter associated with the first user to be decreased.

13. The non-transitory computer readable storage medium of claim 12, wherein the one or more programs further comprise instructions for: in accordance with a determination that placing the service request in a service queue associated with the computer system would cause the enqueue counter associated with the first user to be exceeded, declining to place the service request in the service queue to await execution; and throwing an exception by notifying the first user that the service request has not been placed in the service queue.

14. The non-transitory computer readable storage medium of claim 12, wherein the one or more programs further comprise instructions for: in accordance with a determination that executing the service request would cause the dequeue counter associated with the first user to be exceeded, declining to cause the service request to be executed.

15. The non-transitory computer readable storage medium of claim 14, wherein declining to cause the service request to be executed includes, in accordance with a determination that the service request is to be retried within a second predefined time period, causing the service request to be placed back into the service queue; and causing the service request to be retried within the second predefined time period.

16. A computer system, comprising, one or more processors;

memory; and one or more programs, wherein the one or more programs are stored in the memory and configured to be executed by the one or more processors, the one or more programs including instructions for:

obtaining a service request from a first user, in a plurality of users, of the computer system;

in accordance with a determination that placing the service request in a service queue associated with the first user would not cause an enqueue counter associated with the first user to be exceeded, causing the service request to be placed in the service queue to await execution, wherein the enqueue counter reflects service requests awaiting execution and currently being executed; and after the service request is placed in the service queue, in accordance with a determination that executing the service request would not cause a dequeue counter that is separate from the enqueue counter associated with the first user to be exceeded,
    causing the service request to be executed;

in accordance with a determination that the service request is not successfully completed and the service request is not to be tried within a first predefined time period,
    abandoning the service request by removing the service request from the service queue without execution;
    causing the dequeue counter associated with the first user to be decreased; and causing the enqueue counter associated with the first user to be decreased.

17. The system of claim 16, wherein the one or more programs further comprise instructions for: in accordance with a determination that placing the service request in a service queue associated with the computer system would cause the enqueue counter associated with the first user to be exceeded,
    declining to place the service request in the service queue to await execution; and
    throwing an exception by notifying the first user that the service request has not been placed in the service queue.

18. The system of claim 16, wherein the one or more programs further comprise instructions for: in accordance with a determination that executing the service request would cause the dequeue counter associated with the first user to be exceeded,
    declining to cause the service request to be executed.

19. The system of claim 18, wherein declining to cause the service request to be executed includes, in accordance with a determination that the service request is to be retried within a second predefined time period,
    causing the service request to be placed back into the service queue; and
    causing the service request to be retried within the second predefined time period.

\* \* \* \* \*